(12) United States Patent
Kitahara et al.

(10) Patent No.: US 10,516,913 B2
(45) Date of Patent: Dec. 24, 2019

(54) RECEIVING DEVICE AND METHOD, TRANSMITTING DEVICE AND METHOD, AND PROGRAM

(71) Applicant: SATURN LICENSING LLC, New York, NY (US)

(72) Inventors: Jun Kitahara, Saitama (JP); Naohisa Kitazato, Tokyo (JP); Yoshiharu Dewa, Tokyo (JP); Yasuaki Yamagishi, Kanagawa (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

(21) Appl. No.: 14/529,461

(22) Filed: Oct. 31, 2014

(65) Prior Publication Data

US 2015/0058875 A1 Feb. 26, 2015

Related U.S. Application Data

(63) Continuation of application No. 13/452,376, filed on Apr. 20, 2012, now Pat. No. 8,904,417.

(Continued)

(51) Int. Cl.
*H04N 21/434* (2011.01)
*H04H 20/40* (2008.01)
*H04N 21/472* (2011.01)
*H04N 21/482* (2011.01)
*H04H 20/93* (2008.01)
*H04H 60/13* (2008.01)
(Continued)

(52) U.S. Cl.
CPC ........ *H04N 21/4349* (2013.01); *H04H 20/40* (2013.01); *H04H 20/93* (2013.01); *H04H 60/13* (2013.01); *H04N 21/23617* (2013.01); *H04N 21/4302* (2013.01); *H04N 21/478* (2013.01); *H04N 21/47214* (2013.01); *H04N 21/482* (2013.01); *H04N 21/6543* (2013.01); *H04N 21/858* (2013.01); *H04H 2201/37* (2013.01)

(58) Field of Classification Search
CPC .................................................. H04N 21/4349
See application file for complete search history.

(56) References Cited

U.S. PATENT DOCUMENTS 8,595,783 B2   11/2013   Dewa
8,705,933 B2    4/2014   Eyer
(Continued)

FOREIGN PATENT DOCUMENTS

CN    1501711 A    6/2004
CN  101778255 A    7/2010
(Continued)

OTHER PUBLICATIONS

Extended European Search Report dated Sep. 19, 2014, in European Patent Application No. 12775916.5.

(Continued)

*Primary Examiner* — Jefferey F Harold
*Assistant Examiner* — Justin B Sanders
(74) *Attorney, Agent, or Firm* — Oblon, McClelland, Maier & Neustadt, L.L.P.

(57) ABSTRACT

The present disclosure provides a receiving device including, a receiver that receives AV content, a detector, an acquirer, a tentative reservation registering part, and a definitive reservation registering part.

19 Claims, 14 Drawing Sheets

Related U.S. Application Data

(60) Provisional application No. 61/480,033, filed on Apr. 28, 2011.

(51) Int. Cl.
*H04N 21/236* (2011.01)
*H04N 21/43* (2011.01)
*H04N 21/478* (2011.01)
*H04N 21/6543* (2011.01)
*H04N 21/858* (2011.01)

(56) References Cited

U.S. PATENT DOCUMENTS

| | | |
|---|---|---|
| 8,839,338 B2 | 9/2014 | Eyer |
| 8,842,974 B2 | 9/2014 | Kitazato |
| 8,863,171 B2 | 10/2014 | Blanchard et al. |
| 2004/0031058 A1 | 2/2004 | Reisman |
| 2005/0216942 A1* | 9/2005 | Barton ............... H04N 7/17318 725/97 |
| 2006/0242692 A1 | 10/2006 | Thione et al. |
| 2008/0085695 A1* | 4/2008 | Vare ....................... G08B 25/08 455/404.1 |
| 2008/0247543 A1 | 10/2008 | Mick et al. |
| 2008/0288460 A1 | 11/2008 | Poniatowski et al. |
| 2009/0040884 A1 | 2/2009 | Newton et al. |
| 2009/0119724 A1* | 5/2009 | Lemmers ......... H04N 21/23614 725/87 |
| 2009/0174821 A1 | 7/2009 | Matsuo et al. |
| 2009/0276819 A1* | 11/2009 | Kim ..................... H04N 21/235 725/105 |
| 2010/0161757 A1 | 6/2010 | Suh et al. |
| 2011/0075990 A1* | 3/2011 | Eyer ......................... H04N 5/76 386/241 |
| 2011/0088075 A1 | 4/2011 | Eyer |
| 2011/0243536 A1 | 10/2011 | Eyer |
| 2011/0246488 A1 | 10/2011 | Eyer |
| 2011/0247028 A1 | 10/2011 | Eyer |
| 2011/0298981 A1 | 12/2011 | Eyer |
| 2011/0299827 A1 | 12/2011 | Eyer |
| 2011/0302599 A1 | 12/2011 | Eyer |
| 2011/0302611 A1 | 12/2011 | Eyer |
| 2012/0044418 A1 | 2/2012 | Eyer |
| 2012/0047531 A1 | 2/2012 | Eyer |
| 2012/0050619 A1 | 3/2012 | Kitazato et al. |
| 2012/0050620 A1 | 3/2012 | Kitazato |
| 2012/0054214 A1 | 3/2012 | Yamagishi et al. |
| 2012/0054267 A1 | 3/2012 | Yamagishi et al. |
| 2012/0054268 A1 | 3/2012 | Yamagishi |
| 2012/0054783 A1 | 3/2012 | Yamagishi |
| 2012/0054784 A1 | 3/2012 | Kitazato et al. |
| 2012/0060197 A1 | 3/2012 | Kitahara et al. |
| 2012/0063508 A1 | 3/2012 | Hattori et al. |
| 2012/0072965 A1 | 3/2012 | Dewa |
| 2012/0081508 A1 | 4/2012 | Kitazato |
| 2012/0081607 A1 | 4/2012 | Kitazato |
| 2012/0082266 A1 | 4/2012 | Kitazato et al. |
| 2012/0084802 A1 | 4/2012 | Kitazato |
| 2012/0084824 A1 | 4/2012 | Kitazato |
| 2012/0084829 A1 | 4/2012 | Kitazato |
| 2012/0185888 A1 | 7/2012 | Eyer et al. |
| 2012/0253826 A1 | 10/2012 | Kitazato et al. |
| 2012/0274848 A1 | 11/2012 | Kitahara et al. |
| 2012/0275764 A1 | 11/2012 | Eyer |
| 2013/0024894 A1 | 1/2013 | Eyer |
| 2013/0024897 A1 | 1/2013 | Eyer |
| 2013/0031569 A1 | 1/2013 | Eyer |
| 2013/0036440 A1 | 2/2013 | Eyer |
| 2013/0055313 A1 | 2/2013 | Eyer |
| 2013/0103716 A1 | 4/2013 | Yamagishi |
| 2013/0145414 A1 | 6/2013 | Yamagishi |
| 2013/0167171 A1 | 6/2013 | Kitazato et al. |
| 2013/0191860 A1 | 7/2013 | Kitazato et al. |
| 2013/0198768 A1 | 8/2013 | Kitazato |
| 2013/0201399 A1 | 8/2013 | Kitazato et al. |
| 2013/0205327 A1 | 8/2013 | Eyer |
| 2013/0212634 A1 | 8/2013 | Kitazato |
| 2013/0215327 A1 | 8/2013 | Kitazato et al. |
| 2013/0250173 A1 | 9/2013 | Eyer |
| 2013/0254824 A1 | 9/2013 | Eyer |
| 2013/0282870 A1 | 10/2013 | Dewa et al. |
| 2013/0283311 A1 | 10/2013 | Eyer |
| 2013/0283328 A1 | 10/2013 | Kitazato |
| 2013/0291022 A1 | 10/2013 | Eyer |
| 2013/0291049 A1 | 10/2013 | Kitazato |
| 2013/0340007 A1 | 12/2013 | Eyer |
| 2014/0013347 A1 | 1/2014 | Yamagishi |
| 2014/0013379 A1 | 1/2014 | Kitazato et al. |
| 2014/0020038 A1 | 1/2014 | Dewa |
| 2014/0020042 A1 | 1/2014 | Eyer |
| 2014/0040965 A1 | 2/2014 | Kitazato et al. |
| 2014/0040968 A1 | 2/2014 | Kitazato et al. |
| 2014/0043540 A1 | 2/2014 | Kitazato et al. |
| 2014/0053174 A1 | 2/2014 | Eyer et al. |
| 2014/0067922 A1 | 3/2014 | Yamagishi et al. |
| 2014/0099078 A1 | 4/2014 | Kitahara et al. |
| 2014/0122528 A1 | 5/2014 | Yamagishi |
| 2014/0137153 A1 | 5/2014 | Fay et al. |
| 2014/0137165 A1 | 5/2014 | Yamagishi |
| 2014/0150040 A1 | 5/2014 | Kitahara et al. |
| 2014/0157304 A1 | 6/2014 | Fay et al. |
| 2014/0173661 A1 | 6/2014 | Yamagishi |
| 2014/0186008 A1 | 7/2014 | Eyer |
| 2014/0208375 A1 | 7/2014 | Fay et al. |
| 2014/0208380 A1 | 7/2014 | Fay et al. |
| 2014/0229580 A1 | 8/2014 | Yamagishi |
| 2014/0229979 A1 | 8/2014 | Kitazato et al. |
| 2014/0253683 A1 | 9/2014 | Eyer et al. |

FOREIGN PATENT DOCUMENTS

| | | |
|---|---|---|
| EP | 1 207 692 A1 | 5/2002 |
| JP | 2011-41242 | 2/2011 |
| KR | 10-2010-0038047 | 4/2010 |
| RU | 2 357 377 C2 | 5/2009 |
| WO | WO 2006/075885 | 7/2006 |
| WO | WO 2007/072821 | 6/2007 |
| WO | WO 2008/100062 | 8/2008 |

OTHER PUBLICATIONS

International Search Report dated Jun. 19, 2012, in PCT/JP2012/060614 filed Apr. 19, 2012 with English translation.
U.S. Appl. No. 13/930,814, filed Jun. 28, 2013, Fay.
U.S. Appl. No. 13/930,880, filed Jun. 28, 2013, Fay et al.
U.S. Appl. No. 13/934,549, filed Jul. 3, 2013, Fay et al.
U.S. Appl. No. 13/934,615, filed Jul. 3, 2013, Eyer.
U.S. Appl. No. 13/955,130, filed Jul. 31, 2013, Fay.
U.S. Appl. No. 14/275,231, filed May 12, 2014, Eyer.
U.S. Appl. No. 14/295,695, filed Jun. 4, 2014, Eyer.
U.S. Appl. No. 14/457,290, filed Aug. 12, 2014, Eyer.
U.S. Appl. No. 14/458,310, filed Aug. 13, 2014, Eyer.
U.S. Appl. No. 14/490,263, filed Sep. 18, 2014, Blanchard et al.
U.S. Appl. No. 14/493,661, filed Sep. 23, 2014, Yamagishi.
U.S. Appl. No. 14/493,721, filed Sep. 23, 2014, Kitazato.
U.S. Appl. No. 14/504,455, filed Oct. 2, 2014, Fay.
U.S. Appl. No. 14/504,984, filed Oct. 2, 2014, Eyer.
U.S. Appl. No. 14/509,200, filed Oct. 8, 2014, Eyer.
U.S. Appl. No. 14/509,166, filed Oct. 8, 2014, Kitazato.
U.S. Appl. No. 14/512,761, filed Oct. 13, 2014, Fay.
U.S. Appl. No. 14/512,776, filed Oct. 13, 2014, Kitazato.
U.S. Appl. No. 14/521,034, filed Oct. 22, 2014, Eyer.
Chinese Office Action dated May 5, 2016 in Patent Application No. 201280019357.3 (with English language translation).
Office Action dated Apr. 18, 2018 in Korean Patent Application No. 10-2013-7027231 (with English Translation).
Extended Search Report dated Oct. 13, 2017 in European Patent Application No. 12775916.5.

\* cited by examiner

FIG. 7A

```
program_stream_map() {
  ...
  for (i=0; i<N; i++) {
    descriptor()
  }
  ...
  for (i=0; i<N2; i++) {
    descriptor()
  }
}
```

FIG. 7B

```
ATSC_trigger() {
  descriptor_tag
  descriptor_length
  ...
}
```

FIG.12

```
<html>
<body>
<tdo>
...
<item>
    <content name> sportsnews10thApril </content name>
    <content ID> 01234567 </contentID>
    <content url> http://www.abc.com/NRT/sportsnews/940822.mp4
</item>
...
</tdo>
</body>
</html>
```

FIG.13

LIST OF AV CONTENT PERMITTED
TO BE TENTATIVELY RESERVED

| XXXX |
|------|
| XXXX |
| XXXX |

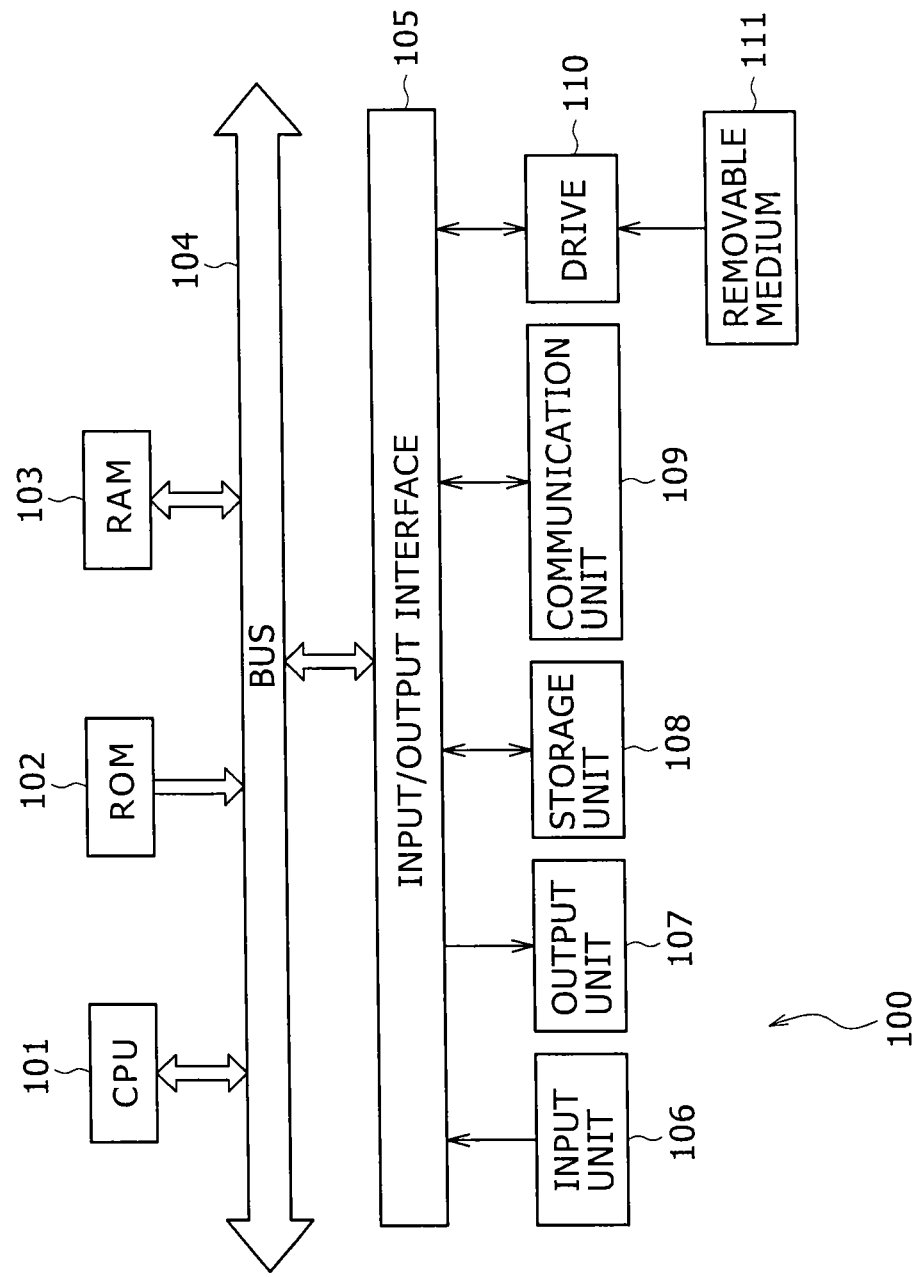

RECEIVING DEVICE AND METHOD, TRANSMITTING DEVICE AND METHOD, AND PROGRAM

CROSS-REFERENCE TO RELATED APPLICATION

This application is a continuation of U.S. application Ser. No. 13/452,376, filed Apr. 20, 2012, which claims the benefit of priority of Provisional Application Ser. No. 61/480,033, filed Apr. 28, 2011, the entire contents of which is incorporated herein by reference.

BACKGROUND

The present technique relates to receiving devices and methods, transmitting devices and methods, and programs, and particularly to receiving device and method, transmitting device and method, and program that enable assured download reservation of AV content.

In recent years, due to dissemination of digital broadcasting, reception of multiple channels and high-definition television broadcasting has become general.

Meanwhile, technique studying and system formulation for enabling not only normal television broadcasting but also more advanced broadcasting service required by viewers by utilizing the band that can be used in the digital broadcasting are being carried out.

Functions required by viewers include on-demand viewing, which allows AV content to be viewed whenever a viewer wants to view it. However, it is considered difficult to realize the on-demand viewing in not broadcasting of bidirectional transmission but broadcasting of unidirectional transmission.

So, in order to enable the on-demand viewing in the broadcasting of unidirectional transmission, studies are being made on the NRT service in which broadcast AV content is temporarily recorded in a storage and thereafter reproduced thereof on the premise that the receiving device holds the high-capacity storage (see Japanese Patent Laid-open No. 2011-41242, hereinafter referred to as Patent Document 1).

The NRT (Non Real Time) service is not premised on viewing in real time. In this service, there is no need to view AV content in synchronization with the broadcast time of the AV content and AV content is transmitted as data by a broadcast signal.

Specifically, in the NRT service, completion of recording (download) in a shorter time is possible if the transmission band of a signal with a broadcast wave is wider for example, differently from past recording reservation of AV content of a broadcast show. Or, download is completed in a longer time if the transmission band of a signal by a broadcast wave is narrower for example.

SUMMARY

In the NRT service of the past, in the case of reserving download of AV content, information that is called NRT-IT (NRT Information Table) and relates to download of AV content transmitted in non-real time needs to be acquired in advance. In the NRT-IT, a list of AV content for which download reservation is possible is described. From the list, desired AV content is selected.

The NRT-IT is periodically transmitted together with AV content. However, if the NRT-IT held by the receiving device is old, even AV content for which download reservation is possible essentially cannot be reserved and the download reservation must be awaited until the NRT-IT is updated. As a result, possibly the opportunity for the download reservation of the AV content is lost.

The present technique is made in view of such circumstances and is to enable assured download reservation of AV content and widening of the opportunity for download reservation.

A receiving device of one embodiment of the present technique includes a receiver that receives AV content, a detector that detects trigger information that is transmitted together with the AV content to be received and relates to control of an application program for being run in conjunction with the AV content, and an acquirer that acquires an application program for allowing selection of AV content for which download reservation is possible and that is transmitted in non-real time, based on the detected trigger information. The receiving device further includes a tentative reservation registering part that registers AV content selected based on the acquired application program as tentative reservation, and a definitive reservation registering part that registers the tentatively reserved AV content as definitive reservation if an identifier of AV content for which download reservation is possible, included in download information that is periodically transmitted together with the AV content and relates to download of AV content transmitted in non-real time, is identical to an identifier of the tentatively reserved AV content.

The tentative reservation registering part registers selected AV content as tentative reservation if the download information is not recorded.

The application program is content for allowing selection of AV content for which download reservation is possible and that is transmitted in non-real time based on a list.

The receiving device further includes a controller that controls acquisition or activation of the application program or stop of the application program that is running, in accordance with a command indicated by the detected trigger information.

The receiving device may be an independent device or may be an internal block configuring one device.

A receiving method or a program of one embodiment of the present technique is a method or a program corresponding to the above-described receiving device of one embodiment of the present technique.

In the receiving device and method and the program of one embodiment of the present technique, AV content is received, and trigger information that is transmitted together with the AV content to be received and relates to control of an application program for being run in conjunction with the AV content is detected. Based on the detected trigger information, an application program for allowing selection of AV content for which download reservation is possible and that is transmitted in non-real time is acquired. Furthermore, AV content selected based on the acquired application program is registered as tentative reservation. In addition, the tentatively reserved AV content is registered as definitive reservation if the identifier of AV content for which download reservation is possible, included in download information that is periodically transmitted together with the AV content and relates to download of AV content transmitted in non-real time, is identical to the identifier of the tentatively reserved AV content.

A transmitting device of one embodiment of the present technique includes a trigger information generator that generates trigger information relating to control of an application program run in conjunction with AV content in a receiving device, a transmitter that transmits the generated trigger information together with the AV content, and a download information generator that generates download information relating to download of the AV content transmitted in non-real time. The transmitter periodically transmits the generated download information together with the AV content.

At least one of commands to control acquisition or activation of an application program for allowing selection of AV content for which download reservation is possible and that is transmitted in non-real time or stop of the application program that is running is included in a command indicated by the trigger information.

The transmitter multiplexes the trigger information into a transport stream corresponding to the AV content and transmits the trigger information.

The transmitter stores the trigger information in an adaptation field of a packet configuring a transport stream corresponding to the AV content and transmits the trigger information.

The transmitting device may be an independent device or may be an internal block configuring one device.

A transmitting method or a program of one embodiment of the present technique is a method or a program corresponding to the above-described transmitting device of one embodiment of the present technique.

In the transmitting device and method and the program of one embodiment of the present technique, trigger information relating to control of an application program run in conjunction with AV content in a receiving device is generated, and the generated trigger information is transmitted together with the AV content. Furthermore, download information relating to download of the AV content transmitted in non-real time is generated, and the generated download information is periodically transmitted together with the AV content.

According to one embodiment of the present technique, the opportunity for download reservation of AV content can be widened.

BRIEF DESCRIPTION OF THE DRAWINGS

FIGS. 7A and 7B are diagrams for explaining an example in which trigger information is multiplexed into a transport stream;

FIG. 12 is a diagram showing a configuration example of TDO content;

FIG. 13 is a diagram showing a display example of a list of AV content permitted to be tentatively reserved; and FIG. 14 is a diagram showing a configuration example of a computer.

DETAILED DESCRIPTION OF THE PREFERRED EMBODIMENT

Figure 1:
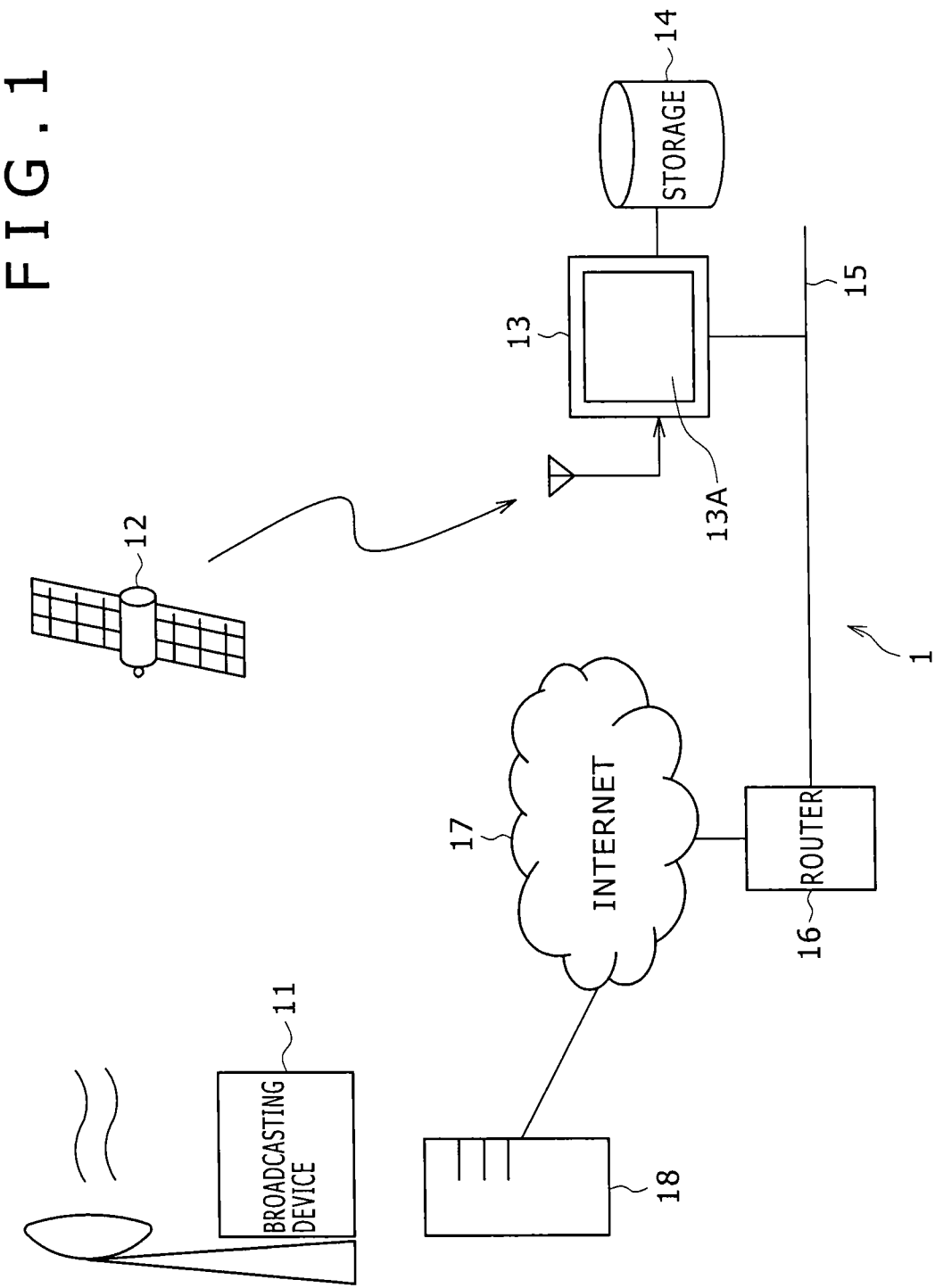
FIG. 1 is a diagram showing a configuration example of a broadcasting system.

An embodiment of the present technique will be described below with reference to the drawings.
[Configuration of Broadcasting System]
FIG. 1 is a diagram showing a configuration example of a broadcasting system.

A broadcasting system 1 is composed of a broadcasting device 11, a receiving device 13, and a content delivery server 18.

The broadcasting device 11 is set at a broadcasting station. The broadcasting device 11 transmits AV content of e.g. show, CM, etc. as a digital television broadcast signal. The digital television broadcast signal is transmitted as normal broadcasting and NRT broadcasting.

The normal broadcasting is broadcasting premised on viewing in real time in the receiving device 13 into which this broadcast signal is received. Furthermore, the NRT broadcasting is not premised on viewing in real time. In the NRT broadcasting, there is no need to view AV content at the broadcast time of the AV content, and the AV content is transmitted as data by a broadcast signal.

Furthermore, the broadcasting device 11 transmits trigger information as a command for ordering execution of data broadcasting content executed in association with the progression of AV content of a show, etc. in such a manner that the trigger information is included in the digital television broadcast signal. This trigger information includes, in addition to information indicating the kind of command, data broadcasting content, i.e. information indicating the acquisition source of the data broadcasting content, and so forth. Details of the trigger information will be described later.

In addition, the broadcasting device 11 periodically transmits information relating to download of AV content transmitted in non-real time in the NRT broadcasting (hereinafter, referred to as download information) together with AV content. As the download information, e.g. the above-described NRT-IT is present. Details thereof will be described later.

The digital television broadcast signal transmitted from the broadcasting device 11 is received by the receiving device 13 by way of a relay station 12.

The receiving device 13 is set at a user's house for example. If the receiving device 13 receives a digital television broadcast signal of the normal broadcasting, the receiving device 13 makes AV content obtained from the digital television broadcast signal be displayed on a display 13A and viewed.

Furthermore, if download of AV content is reserved, the receiving device 13 starts reception of a digital television broadcast signal of the NRT broadcasting at the broadcast start time of the reserved AV content, and records the AV content obtained from the digital television broadcast signal in a storage 14. Moreover, the receiving device 13 reads out the AV content recorded in the storage 14 and reproduces it to thereby make the AV content broadcast by the NRT broadcasting be viewed.

In addition, the receiving device 13 is connected to a LAN (Local Area Network) 15 and can connect to the Internet 17 via a router 16. If trigger information is obtained from a digital television broadcast signal, the receiving device 13 connects to the content delivery server 18 via the Internet 17 based on the acquisition source of data broadcasting content included in the trigger information and acquires the data broadcasting content. The data broadcasting content is not limited by the method of acquiring it via the Internet 17 and may be acquired from a multiplexed stream obtained by demodulating a digital television broadcast signal for example.

The receiving device 13 registers tentative reservation of AV content based on the acquired data broadcasting content and then registers definitive reservation of the tentatively reserved AV content based on the download information periodically transmitted from the broadcasting device 11. Details of download reservation by use of data broadcasting content (TDO content to be described later) will be described later.

The content delivery server 18 is set at a broadcasting station or the like. The content delivery server 18 generates data broadcasting content for presenting a list of AV content for which download reservation is possible in the NRT broadcasting. The content delivery server 18 delivers data broadcasting content via the Internet 17 in response to an acquisition request from the receiving device 13.

The broadcasting system 1 is configured in the above-described manner.

The data broadcasting content is realized through running of an application program supplied to the receiving device 13 by a computer in the receiving device 13. Therefore, hereinafter, the data broadcasting content will be referred to also as data broadcasting application program or data broadcasting application.

[Configuration of Broadcasting Device]

Figure 2:
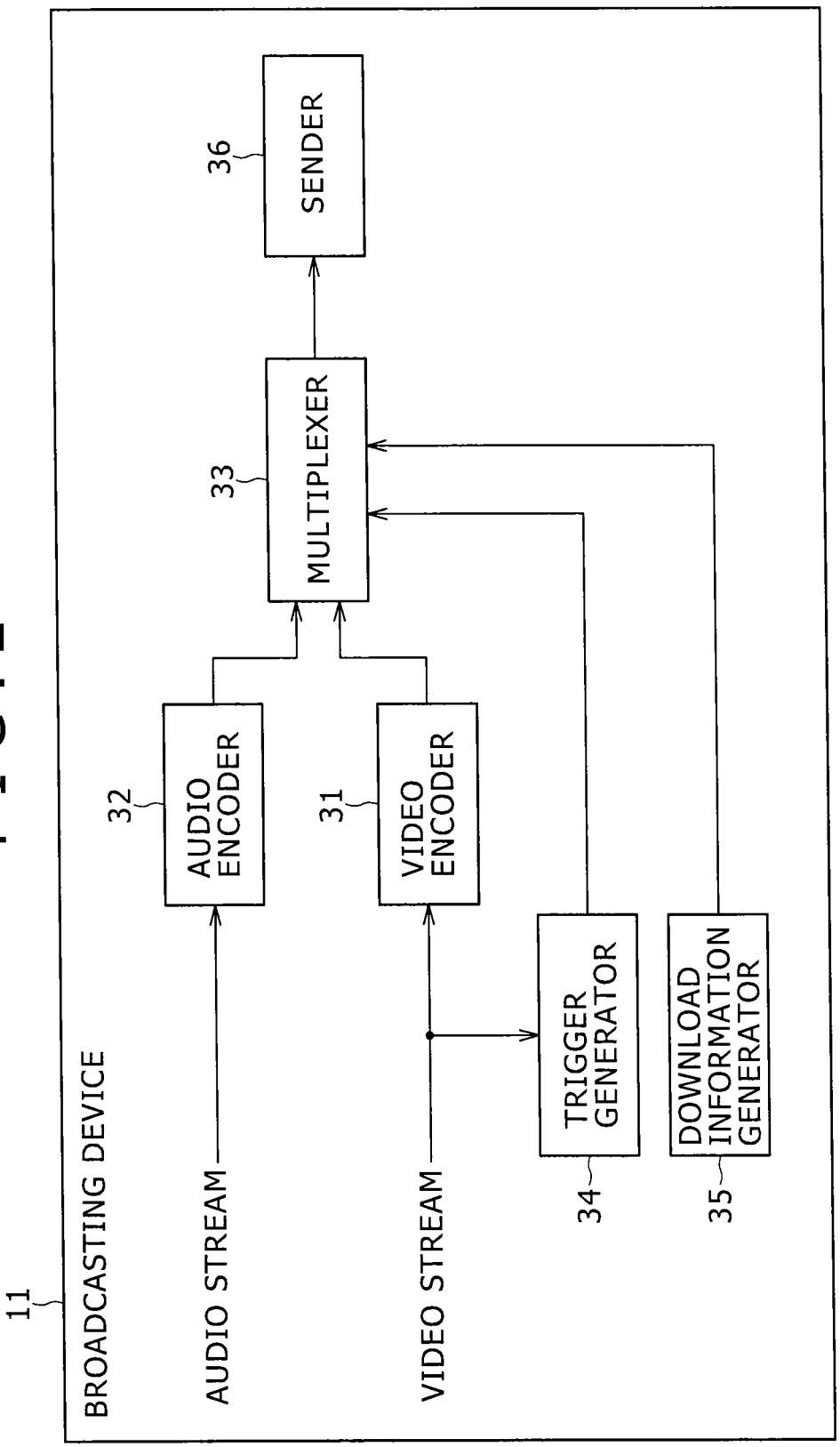
FIG. 2 is a diagram showing a configuration example of a broadcasting device.

FIG. 2 is a diagram showing a configuration example of a broadcasting device.

The broadcasting device 11 is composed of a video encoder 31, an audio encoder 32, a multiplexer 33, a trigger generator 34, a download information generator 35, and a sender 36.

The video encoder 31 encodes the video stream of AV content of a show, etc. input from the previous stage in accordance with a predetermined encoding system and supplies the encoded video stream obtained as the result to the multiplexer 33. Examples of the encoding system in the video encoder 31 include MPEG2 (Moving Picture Experts Group phase 2) system and H.264 system.

The audio encoder 32 encodes the audio stream corresponding to the video stream input to the video encoder 31 in accordance with a predetermined encoding system and supplies the encoded audio stream obtained as the result to the multiplexer 33. Examples of the encoding system in the audio encoder 32 include AC3 (Audio Code number 3) system and AAC (Advanced Audio Coding) system.

The trigger generator 34 generates trigger information in association with the progression of the video stream of AV content input from the previous stage and supplies it to the multiplexer 33.

The download information generator 35 periodically generates download information such as NRT-IT based on information relating to AV content for which download reservation is possible, and supplies it to the multiplexer 33.

To the multiplexer 33, the encoded video stream from the video encoder 31, the encoded audio stream from the audio encoder 32, the trigger information from the trigger generator 34, and the download information from the download information generator 35 are supplied.

The multiplexer 33 multiplexes the encoded video stream and the encoded audio stream and multiplexes also the trigger information to supply the multiplexed stream obtained as the result to the sender 36. Specifically, the multiplexer 33 multiplexes the streams into e.g. TS (transport stream). Alternatively, in consideration of network delivery of digital television broadcasting, the multiplexer 33 may multiplex the streams into the ISO base media file format (MP4) suitable for it.

Furthermore, if the download information is supplied from the download information generator 35, the multiplexer 33 multiplexes the download information into the multiplexed stream.

The sender 36 sends out the multiplexed stream supplied from the multiplexer 33 as a digital television broadcast signal.

The broadcasting device 11 is configured in the above-described manner.

[Configuration of Receiving Device]

Figure 3:
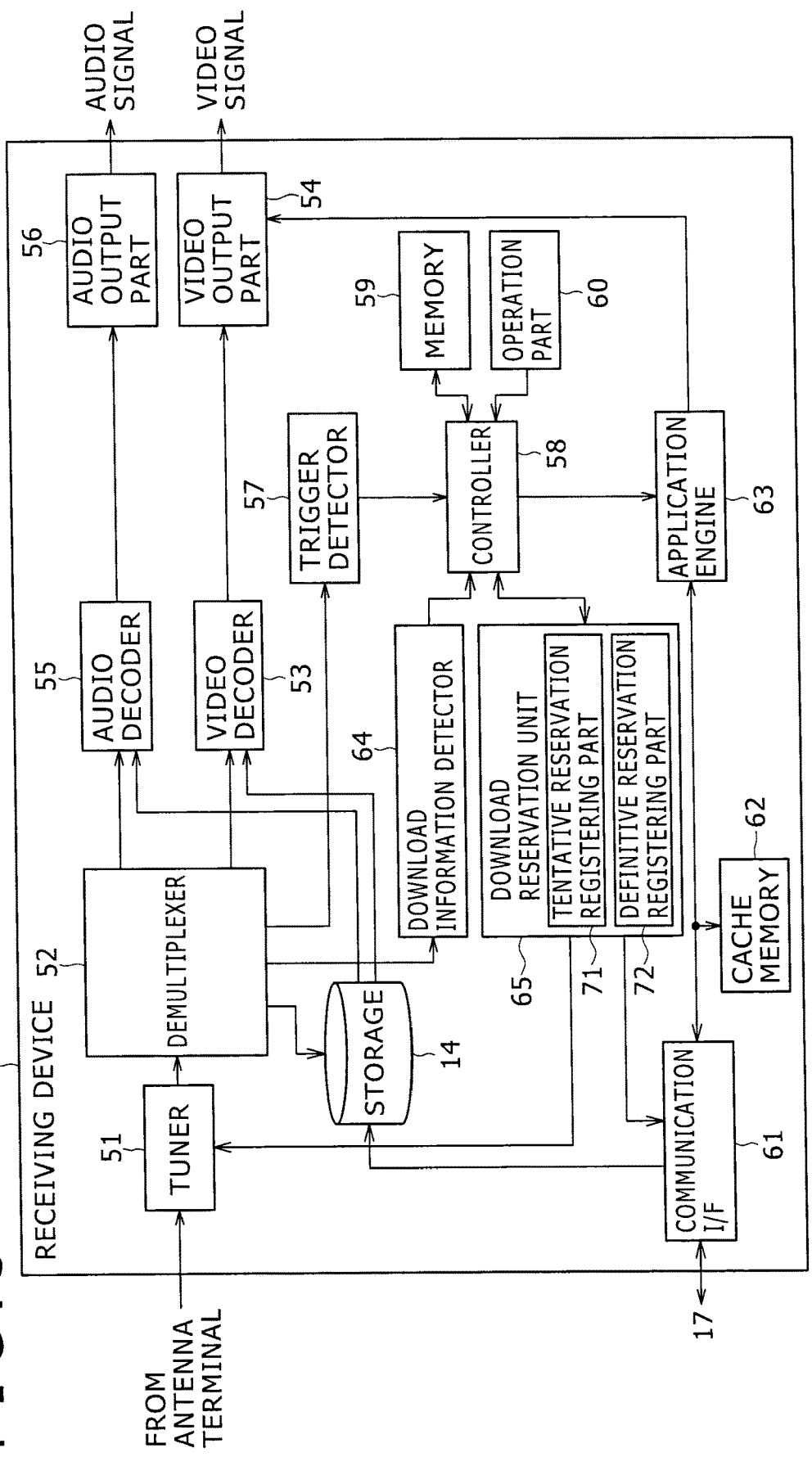
FIG. 3 is a diagram showing a configuration example of a receiving device.

FIG. 3 is a diagram showing a configuration example of the receiving device.

The receiving device 13 is composed of a tuner 51, a demultiplexer 52, a video decoder 53, a video output part 54, an audio decoder 55, an audio output part 56, a trigger detector 57, a controller 58, a memory 59, an operation part 60, a communication I/F 61, a cache memory 62, an application engine 63, a download information detector 64, and a download reservation unit 65.

The tuner 51 receives and demodulates a digital television broadcast signal corresponding to the channel selected by the user and supplies the multiplexed stream obtained as the result to the demultiplexer 52.

The demultiplexer 52 separates the multiplexed stream supplied from the tuner 51 and supplies the separated encoded video stream and encoded audio stream to the video decoder 53 and the audio decoder 55, respectively. Furthermore, if trigger information or download information transmitted together with the multiplexed stream is detected, the demultiplexer 52 supplies the trigger information and the download information to the trigger detector 57 and the download information detector 64, respectively.

The video decoder 53 decodes the encoded video stream from the demultiplexer 52 and supplies the video signal obtained as the result to the video output part 54.

The video output part 54 outputs the video signal supplied from the video decoder 53 to the subsequent stage (e.g. display 13A). Furthermore, the video output part 54 combines a video signal of a data broadcasting application program (hereinafter, referred to as data broadcasting application) supplied from the application engine 63 and the video signal supplied from the video decoder 53, and outputs the resulting signal to the subsequent stage.

The audio decoder 55 decodes the encoded audio stream from the demultiplexer 52 and supplies the audio signal obtained as the result to the audio output part 56.

The audio output part 56 outputs the audio signal supplied from the audio decoder 55 to the subsequent stage (e.g. speaker).

The trigger detector 57 detects trigger information from the multiplexed stream separated by the demultiplexer 52 and supplies it to the controller 58.

The controller 58 runs a control program recorded in the memory 59 to thereby control the operation of the respective parts of the receiving device 13. Furthermore, the controller 58 controls acquisition, activation, event firing, suspension, stop, and so forth of the data broadcasting application based on the trigger information supplied from the trigger detector 57.

The operation part 60 accepts various kinds of operation from the user and notifies the controller 58 of an operation signal corresponding to it.

The communication I/F 61 connects to the content delivery server 18 via the Internet 17 in accordance with control from the application engine 63. The application engine 63 acquires a data broadcasting application from the content delivery server 18 via the communication I/F 61 and the Internet 17 and makes the cache memory 62 retain it in accordance with control from the controller 58.

The application engine 63 reads out and runs the data broadcasting application retained in the cache memory 62 in accordance with control from the controller 58.

The download information detector 64 detects download information from the multiplexed stream separated by the demultiplexer 52 and supplies it to the controller 58.

The controller 58 analyzes the download information supplied from the download information detector 64 and records the analysis result in the memory 59.

The download reservation unit 65 executes processing relating to download reservation of AV content in accordance with control from the controller 58. The download reservation unit 65 is composed of a tentative reservation registering part 71 and a definitive reservation registering part 72.

The tentative reservation registering part 71 registers desired AV content selected through running of the data broadcasting application as tentative reservation in accordance with control from the controller 58.

If the identifier of AV content included in the download information analyzed by the controller 58 is identical to the identifier of AV content tentatively reserved by the tentative reservation registering part 71, the definitive reservation registering part 72 registers the tentatively reserved AV content as definitive reservation in accordance with control from the controller 58.

When the present time has become the broadcast start time of the AV content for which definitive reservation is registered, the download reservation unit 65 controls the tuner 51 to download the AV content of a predetermined channel. The multiplexed stream received by the tuner 51 and demodulated is separated by the demultiplexer 52 and recorded in the storage 14. If the AV content is acquired from a delivery server connected to the Internet 17, when the present time has become the reservation start time of the AV content for which definitive reservation is registered, the download reservation unit 65 controls the communication I/F 61 to download the AV content of a predetermined channel. The AV content received by the communication I/F 61 is recorded in the storage 14.

If reproduction of AV content recorded in the storage 14 is ordered, the video decoder 53 reads out and decodes the encoded video stream recorded in the storage 14 and outputs the video signal obtained as the result to the subsequent stage via the video output part 54. Furthermore, the audio decoder 55 reads out and decodes the encoded audio stream recorded in the storage 14 and outputs the audio signal obtained as the result to the subsequent stage via the audio output part 56.

The receiving device 13 is configured in the above-described manner.

[Details of NRT Broadcasting]

Next, details of the NRT broadcasting will be described below. In the NRT broadcasting, the following two systems exist: a system in which the user selects individual AV content and thereafter the AV content is received and accumulated (hereinafter, referred to as Pull-type NRT broadcasting); and a system in which the user registers viewing of a set of specified pieces of AV content and thereafter the receiving device 13 automatically receives and accumulates these pieces of AV content (hereinafter, referred to as Push-type NRT broadcasting).

Here, the Pull-type NRT broadcasting will be described below.

Figure 4:
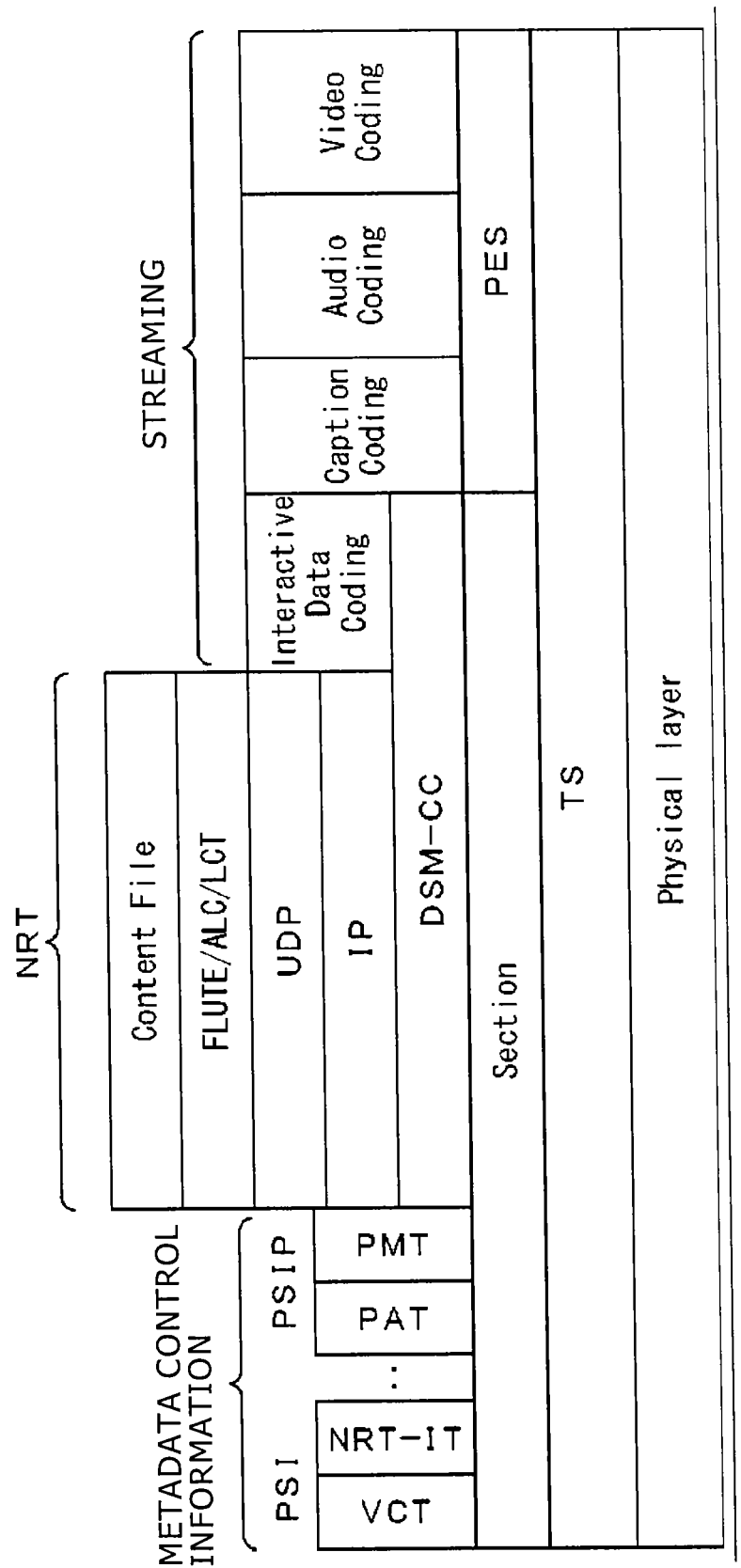
FIG. 4 is a diagram showing the protocol stack of a signal of a broadcast wave.

FIG. 4 is a diagram showing the protocol stack in a signal of a broadcast wave including the NRT broadcasting and the normal broadcasting.

As shown in FIG. 4, the lowermost hierarchical level is used as Physical Layer (physical layer) and the frequency band of the broadcast wave allocated for this channel corresponds to this. The upper hierarchical level adjacent to Physical Layer is used as TS (transport stream).

In TS, a packet of the upper hierarchical level is so transmitted as to be divided into a fixed-length packet called transport packet, and a series of this transport packet serves as a transport stream. That is, signals transmitted in the frequency band corresponding to one broadcast channel are all transmitted by the transport packet having header information corresponding to this broadcast channel and so forth.

The upper hierarchical level adjacent to the transport stream is used as Section or PES (Packetized Elementary Stream). For example, data reproduced in real time like AV content of the normal broadcasting is transmitted as a packet of PES. Furthermore, data of file transfer, data of control information, and so forth are transmitted as a packet of Section.

As shown in FIG. 4, corresponding to the kind of packet of PES, Caption Coding, Audio Coding, and Video Coding are defined as the upper hierarchical level of PES. Caption Coding is a packet in which data relating to a caption of an image is stored. Audio Coding is a packet in which audio data is stored. Video Coding is a packet in which image data is stored.

As the upper hierarchical level adjacent to Section, PSIP and PSI are defined. PSIP (Program and System Information Protocol) is defined as a hierarchical level having VCT, NRT-IT, and so forth. The data of this PSIP is so configured as to include VCT, NRT-IT, and so forth and is periodically received by the receiving device 13. PSI (Program Specific Information) is defined as a hierarchical level having PAT (Program Association Table), PMT (Program Map Table), and so forth.

Furthermore, as the upper hierarchical level adjacent to Section, DSM-CC (Digital Storage Media Command and Control) is displayed. DSM-CC is used as an adaptation layer for transmitting an IP packet on MPEG2-TS of a broadcast stream. DSM-CC is defined as the ISO standard.

As the upper hierarchical level adjacent to DSM-CC, Interactive Data Coding is displayed. Streaming broadcasting is realized by the data stored in Interactive Data Coding, Caption Coding, Audio Coding, and Video Coding. That is, by receiving these data, a show of the normal broadcasting can be received and reproduced.

Furthermore, as the upper hierarchical level adjacent to DSM-CC, IP is displayed. IP displayed here is the same as IP in the protocol stack of TCI/IP and an IP packet is specified by the IP address. The NRT broadcasting is configured by using the IP packet. Of course, the NRT broadcasting is offered as not communication but broadcasting. Therefore, essentially the protocol stack of TCI/IP, which is a communication protocol, does not have to be used. However, the IP packet is formally used in download of AV content.

The upper hierarchical level adjacent to IP is used as UDP and FLUTE/ALC (Asynchronous Layered Coding Protocol)/LCT (Layered Coding Transport (Building Block)) is displayed as the upper hierarchical level thereof. Specifically, in the NRT broadcasting, a packet in which a UDP port in TCP/IP communication is specified is transmitted, and a session by FLUTE (File Delivery over Unidirectional Transport) is established for example. Details of FLUTE are defined as RFC3926.

Figure 5:
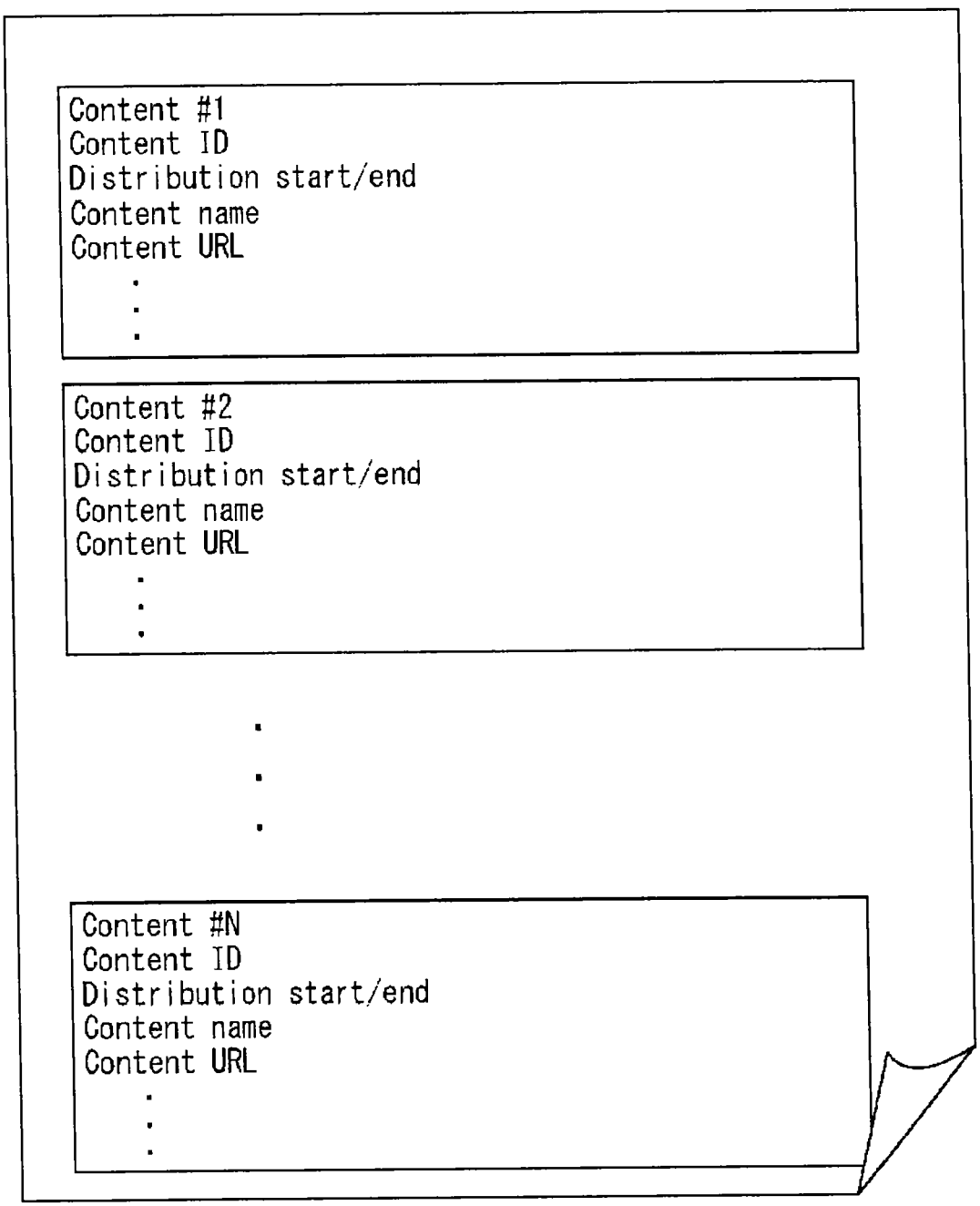
FIG. 5 is a diagram showing a configuration example of NRT-IT.

FIG. 5 is a diagram showing an example of NRT-IT.

The NRT-IT (NRT Information Table) is a table configured with descriptors for enabling identification of each piece of AV content of the NRT broadcasting, broadcast on each channel, in the receiving device 13.

As shown in FIG. 5, in the NRT-IT, information relating to download of each piece of AV content is described in the description area of each piece of AV content. In the example of FIG. 5, for each of Content#1, Content#2, . . . , Content#N, information such as Content ID, Distribution start/end, Content name, and Content URL is described in the description area thereof.

As Content ID, an ID for identification of the AV content is described. This ID is described with predetermined characters, numerals, etc.

As Distribution start/end, information relating to the delivery schedule of the AV content is described. As the delivery schedule, information representing the broadcast start time and broadcast end time of the AV content is described. Because the AV content is AV content of the NRT broadcasting, not the time during which the AV content can be viewed but the time when download of the AV content should be started and the time when the download should be ended are represented by the broadcast start time and the broadcast end time.

As Content name, information relating to the name of the AV content is described. As this name, the title of the AV content is described by a character string, numerals, etc. for example.

As Content URL, information relating to URL (Uniform Resource Locator) for specifying the place where the AV content is disposed is described.

In this manner, Distribution start/end, Content name, and Content URL are described in the description area of the NRT-IT as information relating to the AV content identified by Content ID, and the NRT-IT in which these pieces of information are described is transmitted as download information.

It is also possible to describe e.g. information relating to the version and expiration date of the AV content and so forth in the description area of the NRT-IT.

The NRT-IT is configured in the above-described manner.

About this NRT-IT, a description is given in e.g. patent document 1 (Japanese Patent Laid-open No. 2011-41242), which is an application by the present assignee.

[Details of Trigger Information]

Next, details of trigger information will be described below. The trigger information is information for controlling a data broadcasting application. In this trigger information, commands of e.g. pre-cache, execute, inject event, suspend, and terminate are included.

The pre-cache command (Pre-cache) is a command for ordering acquisition of a data broadcasting application. Furthermore, the execute command (Execute) is a command for ordering activation of a data broadcasting application.

Moreover, the inject event command (Inject_event) is a command for firing an event in the running data broadcasting application.

The suspend command (Suspend) is a command for suspending the running data broadcasting application. Furthermore, the terminate command (Terminate) is a command for stopping the running data broadcasting application.

Figure 6:
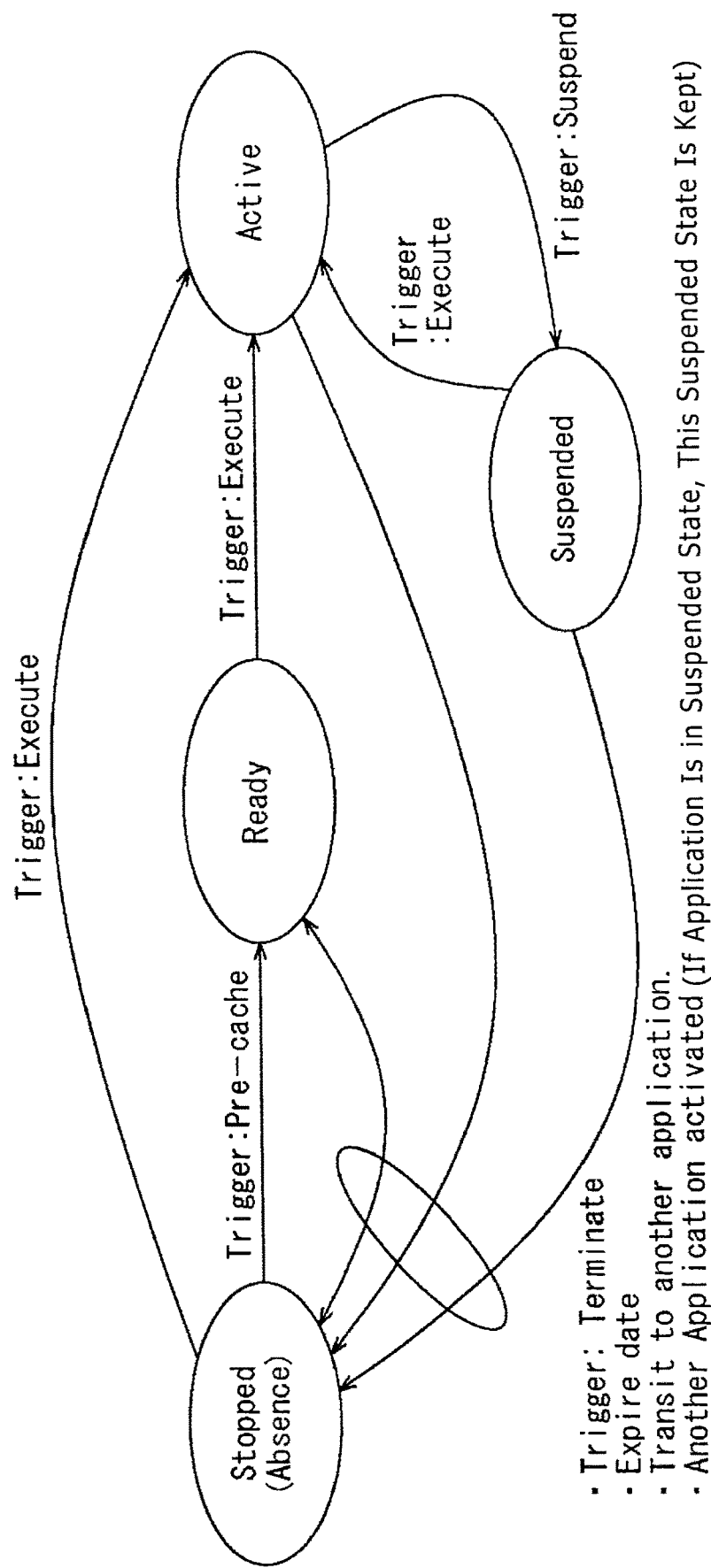
FIG. 6 is a state transition diagram of an application program.

FIG. 6 is a state transition diagram of a data broadcasting application that operates in the receiving device 13 in response to the respective commands of pre-cache, execute, inject event, suspend, and terminate.

As shown in FIG. 6, it is defined that the state of the data broadcasting application has transitioned to one of four kinds of states, i.e. stopped state (Stopped), ready state (Ready), active state (Active), and suspended state (Suspended).

The stopped state refers to the state in which the data broadcasting application has not yet been acquired into the receiving device 13. The ready state refers to the state in which the data broadcasting application has been acquired into the receiving device 13 and is not activated. The active state refers to the state in which the data broadcasting application is activated and running. The suspended state refers to the state in which the execution of the data broadcasting application is interrupted and information indicating the state of the interruption timing is retained in a save memory.

When the data broadcasting application has transitioned to the stopped state (has not yet been acquired into the receiving device 13), transition to the ready state occurs if trigger information of the pre-cache command is received and the data broadcasting application is acquired in accordance with the pre-cache command.

When the data broadcasting application is in the ready state, transition to the active state occurs if trigger information of the execute command is received and the data broadcasting application is activated in accordance with the execute command.

Furthermore, when the data broadcasting application has transitioned to the stopped state (has not yet been acquired into the receiving device 13), transition to the active state occurs if trigger information of the execute command is received and the data broadcasting application is acquired and activated in accordance with the execute command.

When the data broadcasting application has transitioned to the active state, transition to the suspended state occurs if trigger information of the suspend command is received and the running data broadcasting application is interrupted in accordance with the suspend command.

When the data broadcasting application has transitioned to the suspended state, transition to the active state occurs if trigger information of the execute command is received and the interrupted data broadcasting application is resumed in accordance with the execute command.

When the data broadcasting application has transitioned to the ready state, the active state, or the suspended state, transition to the stopped state occurs if trigger information of the terminate command is received and the running data broadcasting application is stopped in accordance with the terminate command.

The state of the data broadcasting application transitions in the above-described manner.

FIGS. 7A and 7B show the case in which trigger information is multiplexed into TS.

In this case, the descriptor of the trigger information is defined in the PMT (Program Map Table) descriptor of the TS as shown in FIG. 7A and the trigger information is described as shown in FIG. 7B. Specifically, the syntax of the trigger information is described at a position subsequent to descriptor_length in FIG. 7B.

The descriptor of the trigger information may be defined in not the PMT descriptor but e.g. the SIT (selection information table) descriptor.

Figure 8:
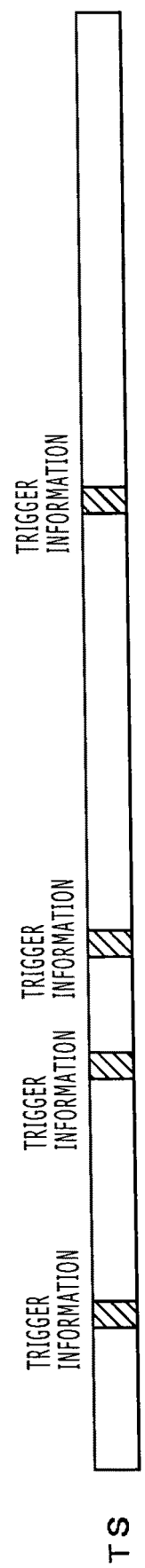
FIG. 8 is a diagram showing a concept that trigger information is so transmitted as to be included in a PCR packet of TS.

FIG. 8 shows the concept of the case in which trigger information is so transmitted as to be disposed in a PCR (Program Clock Reference) packet of the TS of a digital television broadcast signal.

As shown in FIG. 8, the trigger information is not stored in all PCR packets but stored in the PCR packet only at the proper timing for linkage to AV content. The PCR packet is a TS packet with adaptation_field in which PCR is stored. The trigger information is stored in transport_private data byte following PCR.

In FIGS. 7A, 7B and FIG. 8, the example in which trigger information is so transmitted as to be multiplexed into TS and the example in which trigger information is so transmitted as to be stored in PCR are shown. However, the method for storing and transmitting trigger information is not limited thereto. As another method, trigger information may be buried in video information itself for example. Furthermore, although pre-cache, execute, inject event, suspend, and terminate are described as one example of the command of trigger information, it is also possible to use other commands.

Moreover, about this trigger information, a description is given in e.g. Japanese Patent Application No. 2011-041801 (filing date: Feb. 28, 2011), which is an application by the present assignee.

[Flow of AV Content Transmission Processing]

Figure 9:
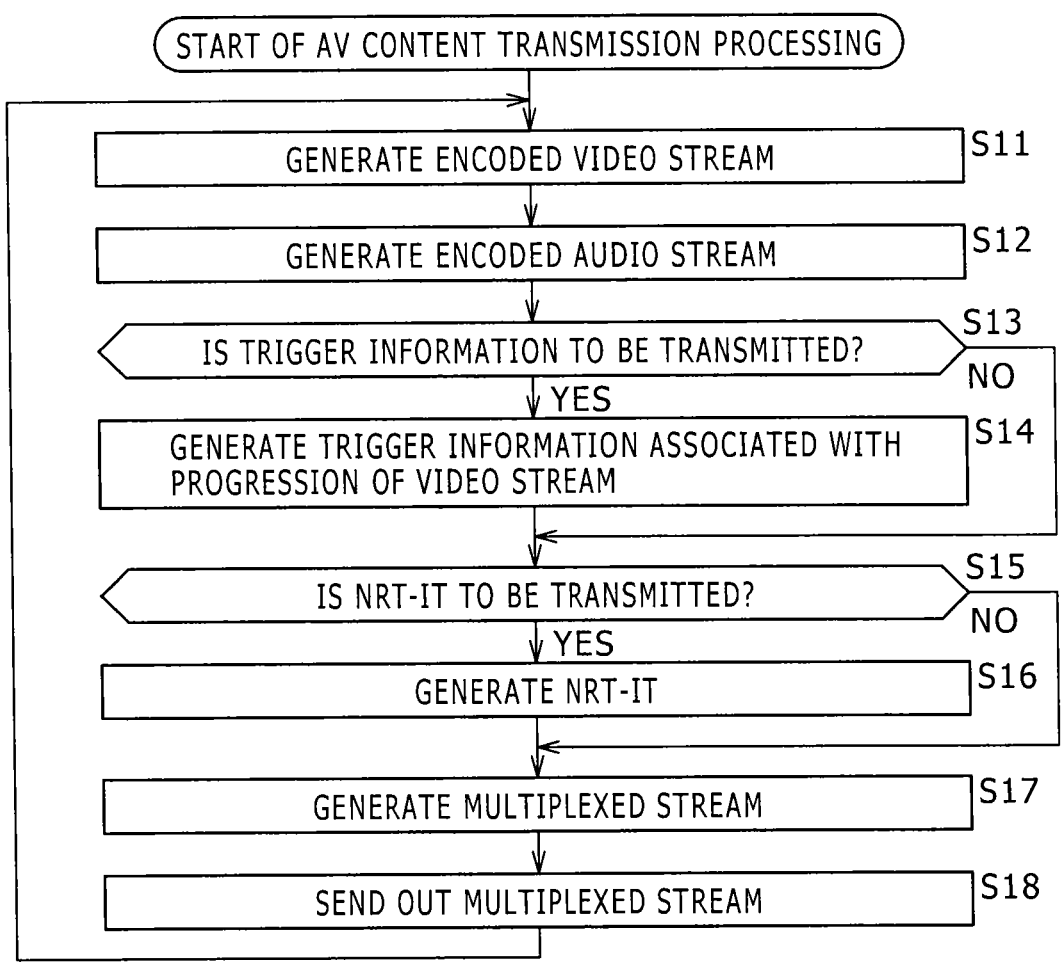
FIG. 9 is a flowchart for explaining AV content transmission processing.

Next, with reference to a flowchart of FIG. 9, AV content transmission processing executed by the broadcasting device 11 will be described below.

In a step S11, the video encoder 31 encodes the video stream of AV content of a show, etc. input from the previous stage and supplies the encoded video stream obtained as the result to the multiplexer 33.

In a step S12, the audio encoder 32 encodes an audio stream input from the previous stage and supplies the encoded audio stream obtained as the result to the multiplexer 33.

In a step S13, the trigger generator 34 determines whether or not to transmit trigger information. If it is determined in the step S13 that trigger information is to be transmitted, the processing proceeds to a step S14.

In the step S14, the trigger generator 34 generates trigger information associated with the progression of the video stream of the AV content input from the previous stage. On the other hand, if it is determined in the step S13 that trigger information is not to be transmitted, the step S14 is skipped and the processing proceeds to a step S15.

In the step S15, the download information generator 35 determines whether or not to transmit NRT-IT (download information). If it is determined in the step S15 that NRT-IT is to be transmitted, the processing proceeds to a step S16.

In the step S16, the download information generator 35 generates NRT-IT based on information relating to AV content for which download reservation is possible. On the other hand, if it is determined in the step S16 that NRT-IT is not to be transmitted, the step S16 is skipped and the processing proceeds to a step S17.

In the step S17, the multiplexer 33 generates a multiplexed stream and supplies it to the sender 36.

Specifically, in the multiplexer 33, the encoded video stream and the encoded audio stream are multiplexed. In addition, trigger information is also multiplexed if the trigger information is transmitted. Moreover, NRT-IT is also multiplexed if the NRT-IT is transmitted.

In a step S18, the sender 36 sends out the multiplexed stream supplied from the multiplexer 33 as a digital television broadcast signal. Thereafter, the processing returns to the step S11 and the above-described subsequent processing is repeated.

In the above-described manner, in the broadcasting device 11, in transmission of AV content, trigger information or NRT-IT is generated at a predetermined timing and transmitted together with the AV content.

[Flow of AV Content Reception Processing]

Next, with reference to FIG. 10 and FIG. 11, AV content reception processing executed by the receiving device 13 will be described below.

In a step S31, the tuner 51 receives and demodulates a digital television broadcast signal corresponding to the channel selected by the user to supply the resulting signal to the demultiplexer 52.

In a step S32, the demultiplexer 52 separates the multiplexed stream from the tuner 51 and supplies the separated encoded video stream and encoded audio stream to the video decoder 53 and the audio decoder 55. Furthermore, if trigger information or NRT-IT transmitted together with the multiplexed stream is detected, the demultiplexer 52 supplies the trigger information and the NRT-IT to the trigger detector 57 and the download information detector 64, respectively.

In a step S33, the video decoder 53 decodes the encoded video stream separated by the demultiplexer 52 and outputs the video signal obtained as the result to the display 13A via the video output part 54.

In a step S34, the audio decoder 55 decodes the encoded audio stream separated by the demultiplexer 52 and outputs the audio signal obtained as the result to a speaker (not shown) via the audio output part 56.

Thereby, the AV content transmitted from the broadcasting device 11 is received and viewed by the user.

In a step S35, the trigger detector 57 determines whether or not trigger information is detected from the multiplexed stream separated by the demultiplexer 52.

If it is determined in the step S35 that trigger information is detected, the processing proceeds to a step S36. In the step S36, the controller 58 analyzes the command indicated by the detected trigger information.

In a step S37, the controller 58 determines whether or not the analyzed command is Pre-cache. If it is determined in the step S37 that the command is Pre-cache, the processing proceeds to a step S38.

In the step S38, the application engine 63 acquires data of TDO content as the data broadcasting application specified by App_id of this trigger information in accordance with control from the controller 58. This TDO content is acquired from the content delivery server 18 and retained in the cache memory 62. App_id is identification information of the data broadcasting application that should be acquired corresponding to this trigger information.

Subsequently, in a step S39, it is determined whether or not the command is Execute. For example, if the analyzed command is Pre-cache ("No" of the step S39), the processing returns to the step S31 and the above-described processing is repeated. Subsequently, if trigger information is detected ("Yes" of the step S35) again and it is determined that the command is Execute ("Yes" of the step S39), the processing proceeds to a step S40.

In the step S40, the application engine 63 activates the TDO content retained in the cache memory 62 as the data broadcasting application specified by App_id in accordance with control from the controller 58.

If program data of the data broadcasting application specified by App_id has not yet been acquired (does not exist in the cache memory 62), the application engine 63 acquires and then activates it. Furthermore, if a currently-running data broadcasting application exists, the application engine 63 stops it and thereafter activates the TDO content.

In a step S41, the application engine 63 determines whether or not information relating to download of AV content permitted to be tentatively reserved (hereinafter, referred to as tentative reservation download information) is included in the TDO content. In the TDO content, e.g. tentative reservation download information shown in FIG. 12 is described.

FIG. 12 is a diagram showing a configuration example of the TDO content.

As shown in FIG. 12, the TDO content is described based on HTML (HyperText Markup Language).

One or more item elements are described between the start tag and the end tag of the tdo element. The respective item elements are composed of content name element, content ID element, and content url element.

The content name element is an element for describing the name of AV content. In the example of FIG. 12, "sportsnews10thApril" is described.

The content ID element is an element for describing the ID to identity AV content. In the example of FIG. 12, "01234567" is described.

The content url element is an element for describing URL to specify the place where AV content is disposed. In the example of FIG. 12, "http://www.abc.com/NRT/sportsnews/940822.mp4" is described.

In this manner, in the TDO content, ID, name, and URL are described for each piece of AV content as the tentative reservation download information for identifying AV content permitted to be tentatively reserved.

In the example of FIG. 12, the tentative reservation download information of one piece of AV content is described as a representative. If there are two or more pieces of AV content permitted to be tentatively reserved, the tentative reservation download information corresponding to that is described based on item element. Furthermore, it is enough that information that enables AV content to be uniquely identified is included in the tentative reservation download information. Therefore, it is not necessary that information of all of ID, name, and URL is included. Furthermore, other pieces of identification information may be used. Moreover, tags other than the tags of tdo element and item element may be used.

Figure 10:
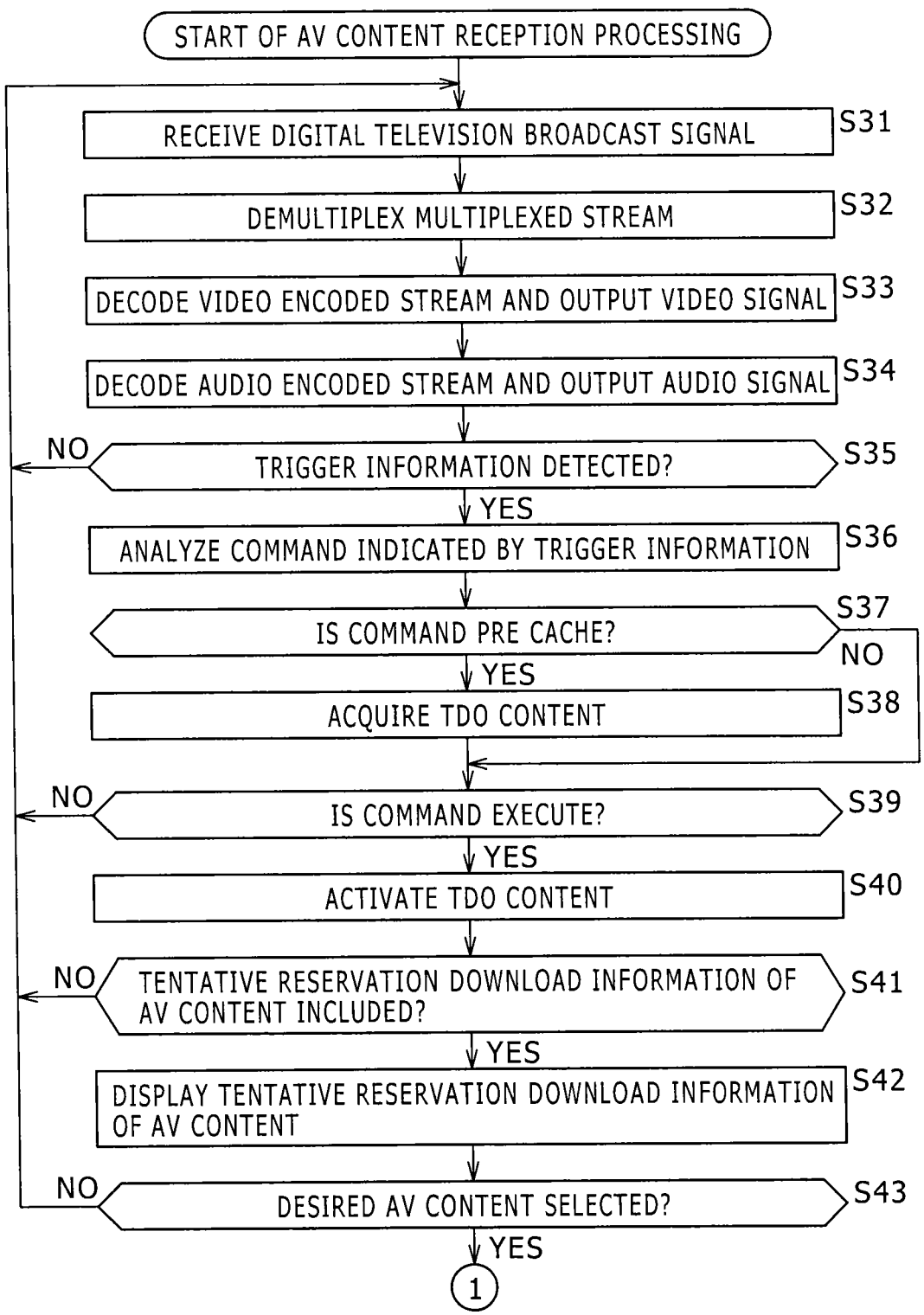
FIG. 10 is a flowchart for explaining AV content reception processing.

Referring back to the flowchart of FIG. 10, if it is determined in the step S41 that tentative reservation download information is included, the processing proceeds to a step S42. In the step S42, the application engine 63 supplies the tentative reservation download information to the video output part 54 and makes the display 13A display it. For example, a list of AV content permitted to be tentatively reserved, like that shown in FIG. 13, is displayed on the display 13A.

Referring back to the flowchart of FIG. 10, in a step S43, the controller 58 determines whether or not desired AV content is selected based on operation of the operation part 60 by the user. If it is determined in the step S43 that desired AV content is selected, the processing proceeds to a step S44 in FIG. 11.

On the other hand, if it is determined in the step S43 that desired AV content is not selected, the processing returns to the step S31 and the above-described processing is repeated. If trigger information is not detected ("No" of the step S35) or if tentative reservation download information is not included in the TDO content ("No" of the step S41), desired AV content is not selected. Thus, the processing returns to the step S31 and the above-described processing is repeated.

Figure 11:
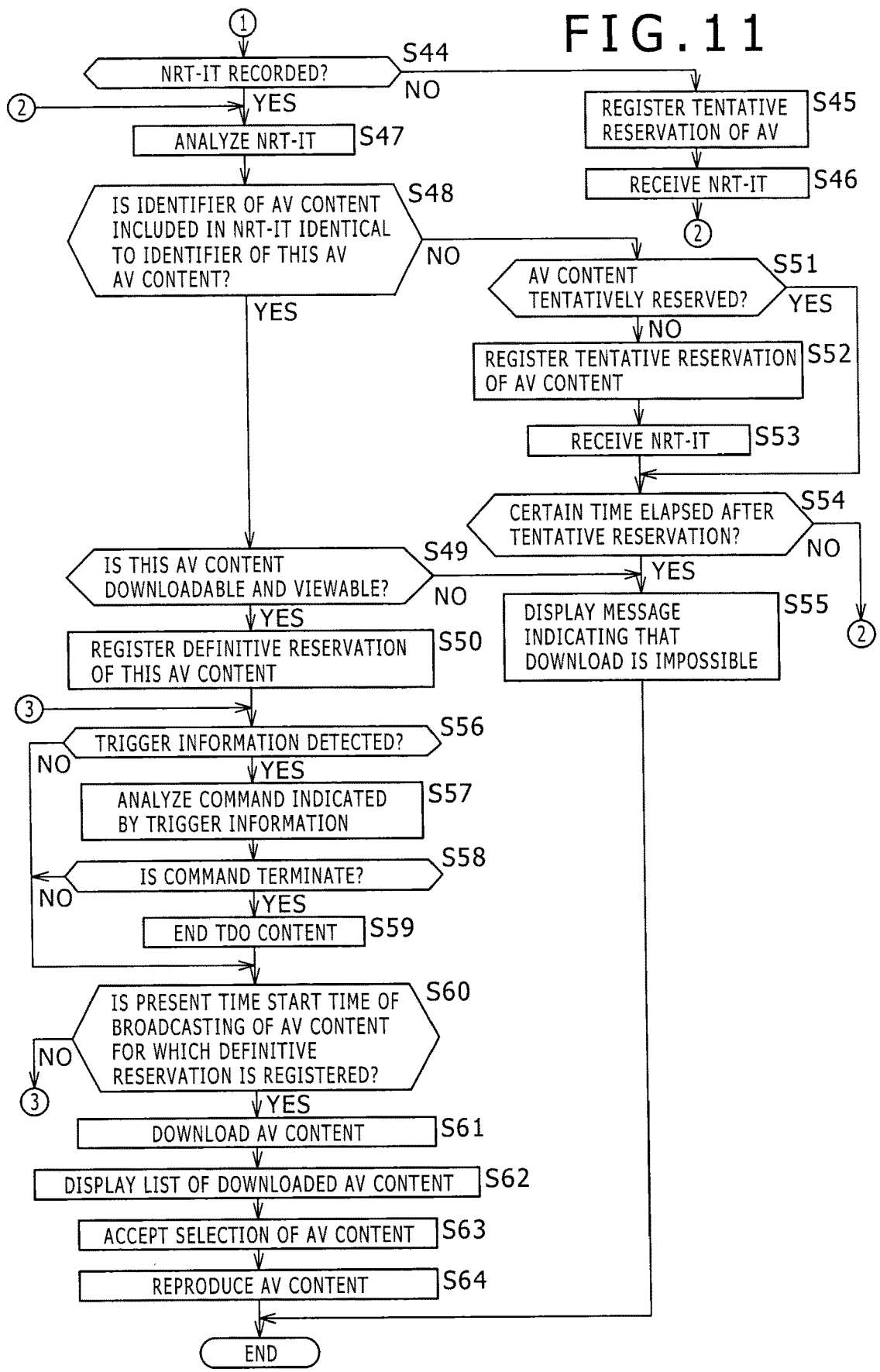
FIG. 11 is a flowchart for explaining the AV content reception processing.

In the step S44 in FIG. 11, the controller 58 determines whether or not NRT-IT periodically transmitted together with AV content is recorded in the memory 59. If it is determined in the step S44 that NRT-IT is not recorded, the processing proceeds to a step S45. For example, if the NRT-IT periodically transmitted from the broadcasting device 11 is not received due to radio interference and acquisition imperfection (reception miss) in the receiving device 13, old NRT-IT remains recorded in the broadcasting device 11.

In the step S45, the tentative reservation registering part 71 registers tentative reservation of the selected desired content in accordance with control from the controller 58. At this timing, because the reservation is tentative, the tentative reservation registration does not ensure that download will be surely performed.

Subsequently, in the receiving device 13, if new NRT-IT is transmitted from the broadcasting device 11, the NRT-IT is received and detected by the download information detector 64 (step S46). In a step S47, the controller 58 analyzes the newly received NRT-IT.

In a step S48, the controller 58 determines whether or not the identifier of AV content included in the NRT-IT is identical to the identifier of the tentatively reserved AV content based on the analysis result of the newly received NRT-IT.

In this determination processing, for example it is determined whether or not Content ID described in the NRT-IT (download information) (FIG. 5) is identical to the ID of the tentatively reserved AV content, described in the content ID element of the TDO content (tentative reservation download information) (FIG. 12). Furthermore, it is also possible to execute the determination processing by use of not only Content ID but other pieces of identification information such as Content name and Content URL that are information common to the NRT-IT of FIG. 5 and the TDO content of FIG. 12.

If it is determined in the step S48 that the identifiers are identical, the processing proceeds to a step S49.

In the step S49, the controller 58 determines whether or not the tentatively reserved AV content is downloadable and viewable. If it is determined in the step S49 that the tentatively reserved AV content is downloadable and viewable, the processing proceeds to a step S50.

In the step S50, the definitive reservation registering part 72 registers the tentatively reserved AV content as definitive reservation in accordance with control from the controller 58.

Specifically, if NRT-IT is not recorded, temporarily the selected desired AV content is registered as tentative reservation. Subsequently, when NRT-IT is newly received, the desired AV content tentatively reserved is registered as definitive reservation if the identifier of AV content included in the NRT-IT is identical to the identifier of the desired AV content tentatively reserved.

Furthermore, if it is determined in the step S44 that NRT-IT is recorded, the processing proceeds to the step S47. Subsequently, in the step S47, the controller 58 analyzes the recorded NRT-IT and determines whether or not the identifier of AV content included in the NRT-IT is identical to the identifier of the selected desired AV content based on the analysis result (step S48). If it is determined in the step S48 that the identifiers of AV content are identical, the processing proceeds to the step S49.

Subsequently, if this AV content is downloadable and viewable ("Yes" of the step S49), the definitive reservation registering part 72 registers the selected desired AV content as definitive reservation in accordance with control from the controller 58 in the step S50.

That is, if NRT-IT is recorded, tentative reservation of the selected desired AV content is not registered and directly this AV content is registered as definitive reservation if the identifier of this AV content is identical to the identifier of AV content included in the NRT-IT.

If it is determined in the step S48 that the identifier of AV content included in the NRT-IT is not identical to the identifier of this AV content, the processing proceeds to a step S51. In the step S51, the controller 58 determines whether or not the AV content has been tentatively reserved. If it is determined in the step S51 that the AV content has not been tentatively reserved, the tentative reservation registering part 71 registers tentative reservation of the AV content in accordance with control from the controller 58 (step S52). On the other hand, if it is determined in the step S51 that the AV content has been tentatively reserved, the step S52 is skipped and the processing proceeds to a step S53. Subsequently, if new NRT-IT is transmitted from the broadcasting device 11, the NRT-IT is received in the receiving device 13 (step S53).

If tentative reservation has been registered (step S45), the controller 58 determines whether or not a certain time has elapsed after this tentative reservation registration in a step S54. If it is determined in the step S54 that the certain time has not elapsed, the processing returns to the step S47, so that the identifier of this AV content is compared with the identifier of AV content included in newly received NRT-IT again.

On the other hand, if it is determined in the step S54 that the certain time has elapsed, the tentative reservation registration is regarded as invalid and cancelled and the processing proceeds to a step S55. In the step S55, the controller 58 controls the application engine 63 and makes the display 13A display a message indicating that download is impossible.

Furthermore, also when it is determined in the step S49 that this AV content is not downloadable and viewable, such as when the storage 14 is deficient in the necessary capacity to record the AV content, the message indicating that download is impossible is displayed similarly. When the capacity deficiency of the storage 14 is resolved, definitive reservation registration may be allowed.

When the processing of the step S55 is ended, the content reception processing of FIG. 10 and FIG. 11 is ended.

That is, if the certain time elapses after tentative reservation registration or if this AV content is not downloadable and viewable, the message is displayed and download of the AV content is not performed.

In a step S56, the trigger detector 57 determines whether or not trigger information is detected from the multiplexed stream separated by the demultiplexer 52.

If it is determined in the step S56 that trigger information is detected, the processing proceeds to a step S57. In the step S57, the controller 58 analyzes the command indicated by the detected trigger information.

In a step S58, the controller 58 determines whether or not the analyzed command is Terminate. If it is determined in the step S58 that the command is Terminate, the processing proceeds to a step S59.

In the step S59, if TDO content that is the data broadcasting application specified by App_id of this trigger information is running, the application engine 63 stops it. Then the processing proceeds to a step S60.

If trigger information is not detected ("No" of the step S56) or if the analyzed command is not Terminate ("No" of the step S58), the processing of trigger information is skipped and the processing proceeds to the step S60. Furthermore, the processing of the end of TDO content based on trigger information may be executed not only after the end of definitive reservation registration but after the end of tentative reservation registration or the like for example.

In the step S60, the download reservation unit 65 determines whether or not the present time has become the broadcast start time of AV content for which definitive reservation is registered, and waits until the present time becomes the broadcast start time. This broadcast start time is specified by Distribution start/end described in NRT-IT. If it is determined in the step S60 that the present time has become the broadcast start time, the processing proceeds to a step S61.

In the step S61, the download reservation unit 65 controls the tuner 51 to download AV content of a predetermined channel. The multiplexed stream received by the tuner 51 and demodulated is separated by the demultiplexer 52 and recorded in the storage 14. In the storage 14, information of NRT-IT and so forth is also recorded together with the AV content. Furthermore, if two or more pieces of AV content are selected, the processing of the steps S61 and S61 is repeated and all pieces of AV content are downloaded. Moreover, if AV content is acquired from a delivery server connected to the Internet 17, the download reservation unit 65 controls the communication I/F 61 to download the AV content of a predetermined channel and the downloaded AV content is recorded in the storage 14.

After the end of the download of AV content, in a step S62, the controller 58 controls the application engine 63 to display a list of the downloaded AV content.

In a step S63, the controller 58 accepts selection of AV content to be reproduced from the displayed list of AV content based on operation of the operation part 60 by the user.

If AV content is selected by the user, the video decoder 53 and the audio decoder 55 read out the encoded video stream and the encoded audio stream, respectively, corresponding to the selected AV content from the storage 14. Subsequently, the video decoder 53 decodes the encoded video stream and outputs the video signal obtained as the result to the display 13A. Furthermore, the audio decoder 55 decodes the encoded audio stream and outputs the audio signal obtained as the result to the speaker (not shown).

Thereby, the AV content that is downloaded from the broadcasting device 11 and recorded in the storage 14 is reproduced and viewed by the user (step S64).

In the above-described manner, in the receiving device 13, trigger information transmitted together with AV content is detected and TDO content as a data broadcasting application is acquired based on the detected trigger information. In addition, desired AV content is selected based on the TDO content. Subsequently, the desired AV content selected based on the TDO content is registered as tentative reservation, and the tentatively reserved AV content is registered as definitive reservation if the identifier of downloadable AV content included in periodically transmitted NRT-IT is identical to the identifier of the tentatively reserved AV content.

Due to this, even if the NRT-IT retained by the receiving device 13 is not the latest, tentative reservation of the desired AV content is registered and the tentative reservation registration is changed to definitive reservation registration after NRT-IT is newly received. Thus, there is no need to await download reservation until NRT-IT is newly received. Therefore, loss of the opportunity for download reservation of AV content is eliminated and thus download reservation of AV content in the NRT service can be surely carried out. As a result, the opportunity for the download reservation can be widened.

The above-described broadcasting system 1 of FIG. 1 realizes data broadcasting content that can be in conjunction with AV content in the state in which the band for broadcasting data broadcasting content is not set in the broadcasting band of digital television broadcasting like in e.g. the present United States. Furthermore, in the above description, the example in which AV content is broadcast by the broadcasting device 11 based on a digital television broadcast signal is mainly explained. However, as described above, a dedicated delivery server may be provided and AV content may be delivered via the Internet 17.

In addition, in the above description, TDO content is explained as a data broadcasting application and the example in which AV content permitted to be tentatively reserved is displayed on the display 13A and selected based on the TDO content is explained. However, AV content may be selected without displaying on the display 13A. For example, through execution of TDO content by the controller 58, AV content may be selected based on conditions set in advance and so forth.

Moreover, the TDO content may be not only acquired and activated based on trigger information but also activated from another piece of TDO content. Furthermore, it is explained that the TDO content is described by HTML. However, the TDO content is configured from JavaScript, JPEG file, PNG file, etc. besides HTML. In addition, it is also possible to employ another description language such as BML (Broadcast Markup Language) as the description language of the TDO content.

Moreover, in the above description, the Pull-type NRT broadcasting is explained. However, the above-described configuration can be similarly applied also to the Push-type NRT broadcasting.

[Description of Computer to which the Present Technique is Applied]

The above-described series of processing can be executed by hardware and can also be executed by software. In the case of executing the series of processing by software, a program configuring the software is installed into a general-purpose computer or the like.

So, FIG. 14 shows a configuration example of one embodiment of the computer into which the program to execute the above-described series of processing is installed.

The program can be recorded in advance in a storing unit 108 such as a hard disc or a ROM (Read Only Memory) 102 incorporated in a computer 100.

Alternatively, the program can be stored (recorded) temporarily or permanently in removable media 111 such as flexible disc, CD-ROM (Compact Disc Read Only Memory), MO (Magneto Optical) disc, DVD (Digital Versatile Disc), magnetic disc, and semiconductor memory. Such removable media 111 can be provided as so-called package software.

Besides the installation from the above-described removable media 111 into the computer 100, the program can be wirelessly transferred from a download site to the computer 100 via an artificial satellite for digital satellite broadcasting or can be transferred to the computer 100 by wiring via a network such as a LAN (Local Area Network) or the Internet. In the computer 100, the thus transferred program can be received by a communication unit 109 and installed into the storing unit 108.

The computer 100 includes a CPU (Central Processing Unit) 101. To the CPU 101, an input/output interface 105 is connected via a bus 104. When an order is input via the input/output interface 105 through operation of an input unit 106 composed of keyboard, mouse, microphone, etc. by the user and so forth, the CPU 101 runs a program stored in the ROM 102 in accordance with it. Alternatively, the CPU 101 loads, in a RAM (Random Access Memory) 103, and runs a program stored in the storing unit 108, a program that is transferred from a satellite or a network to be received by the communication unit 109 and installed into the storing unit 108, or a program that is read out from the removable media 111 mounted in a drive 110 and installed into the storing unit 108. Thereby, the CPU 101 executes processing in accordance with the above-described flowchart or processing executed based on the configuration of the above-described block diagram. Subsequently, according to need, for example the CPU 101 makes the processing result be output from an output unit 107 composed of LCD (Liquid Crystal Display), speaker, etc. or transmitted from the communication unit 109 and recorded in the storing unit 108, and so forth, via the input/output interface 105.

Here, in the present specification, the processing steps that describe the program for making a computer execute various kinds of processing do not necessarily need to be processed in a time-series manner along the order described as the flowchart and encompass also processing executed in parallel or individually (e.g. parallel processing or processing by an object).

Furthermore, the program may be one processed by one computer or may be one subjected to distributed processing by plural computers. Moreover, the program may be one transferred to a distant computer and executed.

In the present specification, the system refers to the whole of a device configured with plural devices.

Moreover, embodiments of the present technique are not limited to the above-described embodiment and various changes can be made in such a range as not to depart from the gist of the present technique.

It should be understood by those skilled in the art that various modifications, combinations, sub-combinations and alterations may occur depending on design requirements and other factors insofar as they are within the scope of the appended claims or the equivalents thereof.

What is claimed is:

1. A reception apparatus, comprising:
   circuitry configured to
   receive primary AV content;
   receive trigger information that is associated with the primary AV content;
   process the primary AV content for display to a user;
   control execution of an application program, which is programmed to receive from the user a selection of downloadable AV content that is transmitted in a broadcast stream in non-real time, based on the detected trigger information;
   receive a non-real-time information table (NRT-IT);
   determine whether the NRT-IT includes download information for the selected downloadable AV content; and
   schedule download of the selected downloadable AV content from the broadcast stream when the NRT-IT is determined to include the download information for the selected downloadable AV content,
wherein the execution of the application program causes the circuitry to display the downloadable AV content for selection by the user to be downloaded from the broadcast stream.

2. The reception apparatus according to claim 1, wherein the circuitry is configured to:
receive a digital television signal that includes the broadcast stream, the broadcast stream including the primary AV content, the trigger information, and the NRT-IT.

3. The reception apparatus according to claim 1, wherein the download information includes a content identifier, a content name, an expiration time, and delivery timing information of the selected downloadable AV content.

4. The reception apparatus according to claim 1, wherein the circuitry is configured to:
schedule the download of the selected downloadable AV content from the broadcast stream according to delivery timing information included in the download information.

5. The reception apparatus according to claim 4, wherein the delivery timing information defines a period of time that the selected downloadable AV content is available for download from the broadcast stream.

6. The reception apparatus according to claim 1, wherein the application program identifies at least one downloadable AV content that is selectable by the user.

7. A method for receiving AV content, the method comprising:
receiving primary AV content;
receiving trigger information that is associated with the primary AV content;
processing the primary AV content for display to a user;
controlling, by circuitry of a reception apparatus, execution of an application program, which is programmed to receive from the user a selection of downloadable AV content that is transmitted in non-real time, based on the detected trigger information;
receiving a non-real-time information table (NRT-IT);
determining, by the circuitry, whether the NRT-IT includes download information for the selected downloadable AV content; and
scheduling, by the circuitry, download of the selected downloadable AV content from the broadcast stream when the NRT-IT is determined to include the download information for the selected downloadable AV content,
wherein the execution of the application program causes the circuitry to display the downloadable AV content for selection by the user to be downloaded from the broadcast stream.

8. The method according to claim 7, further comprising:
receiving a digital television signal that includes the broadcast stream, the broadcast stream including the primary AV content, the trigger information, and the NRT-IT.

9. The method according to claim 7, wherein the download information includes a content identifier, a content name, an expiration time, and delivery timing information of the selected downloadable AV content.

10. The method according to claim 7, wherein the step of scheduling comprises:
scheduling the download of the selected downloadable AV content from the broadcast stream according to delivery timing information included in the download information.

11. The method according to claim 10, wherein the delivery timing information defines a period of time that the selected downloadable AV content is available for download from the broadcast stream.

12. The method according to claim 7, wherein the application program identifies at least one downloadable AV content that is selectable by the user.

13. A non-transitory computer-readable medium storing instructions which, when executed by a computer, cause the computer to perform a method for receiving downloadable AV content, the method comprising:
receiving primary AV content;
receiving trigger information that is associated with the primary AV content;
processing the primary AV content for display to a user;
controlling execution of an application program, which is programmed to receive from the user a selection of the downloadable AV content that is transmitted in a broadcast stream in non-real time, based on the detected trigger information;
receiving a non-real-time information table (NRT-IT);
determining whether the NRT-IT includes download information for the selected downloadable AV content; and
scheduling download of the selected downloadable AV content from the broadcast stream when the NRT-IT is determined to include the download information for the selected downloadable AV content,
wherein the execution of the application program causes the computer to display the downloadable AV content for selection by the user to be downloaded from the broadcast stream.

14. The non-transitory computer-readable medium according to claim 13, wherein the method further comprises:
receiving a digital television signal that includes the broadcast stream, the broadcast stream including the primary AV content, the trigger information, and the NRT-IT.

15. The non-transitory computer-readable medium according to claim 13, wherein the download information includes a content identifier, a content name, an expiration time, and delivery timing information of the selected downloadable AV content.

16. The non-transitory computer-readable medium according to claim 13, wherein the step of scheduling comprises:
scheduling the download of the selected downloadable AV content from the broadcast stream according to delivery timing information included in the download information.

17. The non-transitory computer-readable medium according to claim 16, wherein the delivery timing information defines a period of time that the selected downloadable AV content is available for download from the broadcast stream.

18. The non-transitory computer-readable medium according to claim 13, wherein the application program identifies at least one downloadable AV content that is selectable by the user.

19. The reception apparatus according to claim 1, wherein the execution of the application program causes the circuitry to display a plurality of downloadable AV content for selection by the user to be downloaded from the same broadcast stream, the plurality of downloadable AV content including the downloadable AV content.

* * * * *